United States Patent [19]

Stewart, Jr. et al.

[11] Patent Number: 4,637,436

[45] Date of Patent: Jan. 20, 1987

[54] ANNULAR TUBE-LIKE DRIVER

[75] Inventors: John B. Stewart, Jr., San Francisco; Laszlo Szalvay, San Carlos; Bernard de Brunier, Mountain View; Jeffrey W. Simpson, Sunnyvale, all of Calif.

[73] Assignee: Raychem Corporation, Menlo Park, Calif.

[21] Appl. No.: 797,351

[22] Filed: Nov. 5, 1985

Related U.S. Application Data

[63] Continuation of Ser. No. 700,373, Feb. 11, 1985, abandoned, which is a continuation-in-part of Ser. No. 552,187, Nov. 15, 1983, abandoned.

[51] Int. Cl.$^4$ ............................................. F16L 55/10
[52] U.S. Cl. ........................................ 138/89; 165/76
[58] Field of Search ................... 138/89, 97; 165/76; 220/201

[56] References Cited

U.S. PATENT DOCUMENTS

| Re. 30,802 | 11/1981 | Rogers, Jr. ............. | 138/98 X |
| 3,135,414 | 6/1964 | Lee, II .................... | 138/89 X |
| 3,900,939 | 8/1975 | Graecen .................. | 138/89 X |
| 4,178,966 | 12/1979 | Savor et al. ............. | 138/89 |
| 4,309,807 | 1/1982 | Hill et al. ................ | 29/446 |
| 4,350,183 | 9/1982 | Holmes ................... | 138/89 |
| 4,390,042 | 6/1983 | Kucherer et al. ....... | 138/89 |
| 4,469,357 | 9/1984 | Martin ..................... | 138/89 X |

FOREIGN PATENT DOCUMENTS

| 4696 | 10/1979 | European Pat. Off. . |
| 2514099 | 4/1983 | France . |
| 1488393 | 10/1977 | United Kingdom . |

Primary Examiner—Stephen Marcus
Assistant Examiner—Mark Thronson
Attorney, Agent, or Firm—Ira D. Blecker; T. Gene Dillahunty; Herbert G. Burkard

[57] ABSTRACT

Annular tube-like driver for insertion into a tube insert which in turn is inserted into a tube. The driver is made of a shape-memory alloy which is capable of placing the tube insert in firm engagement with the inside of the tube.

13 Claims, 6 Drawing Figures

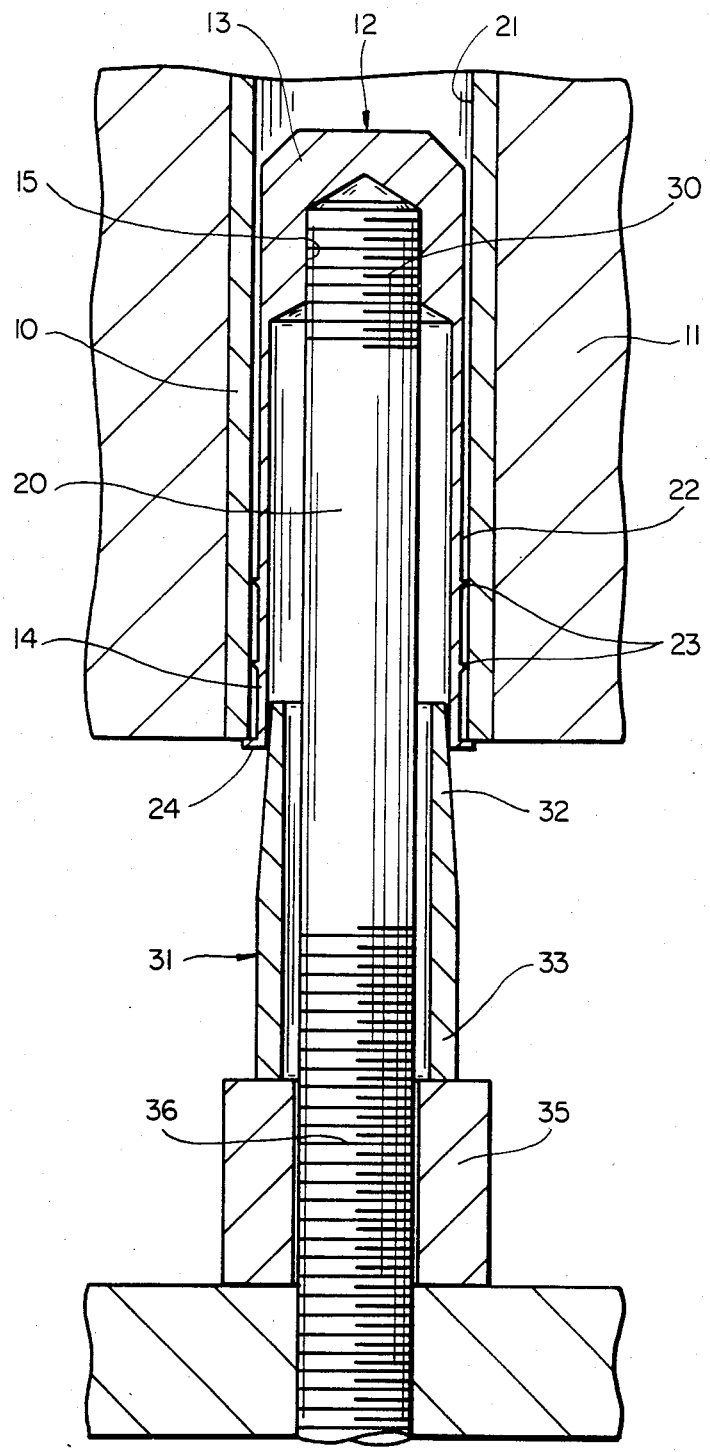
FIG_1

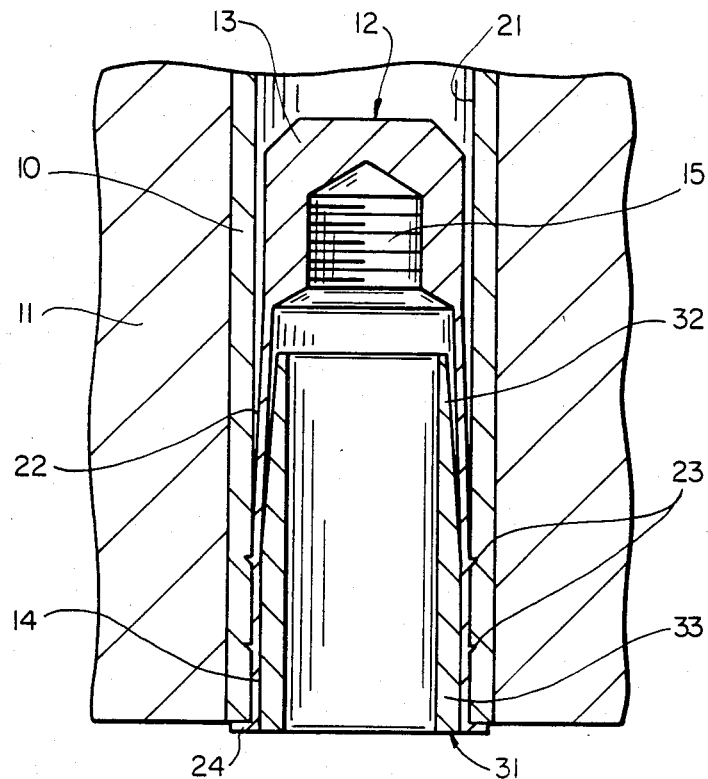
FIG_2
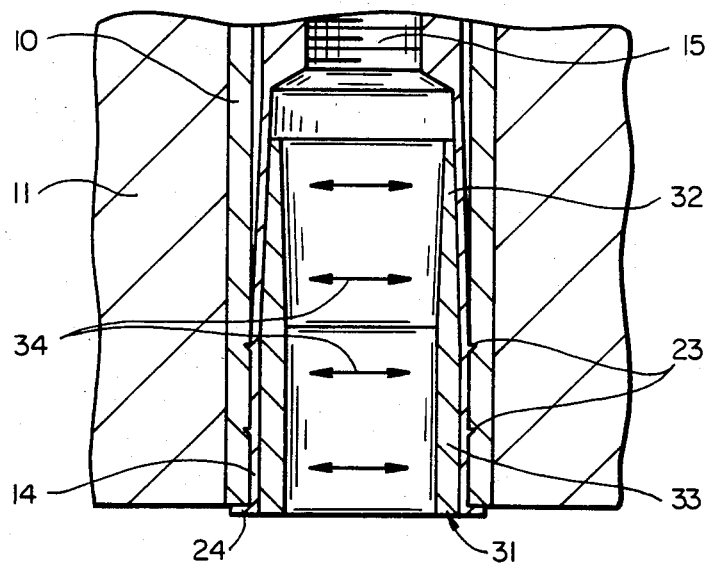
FIG_3

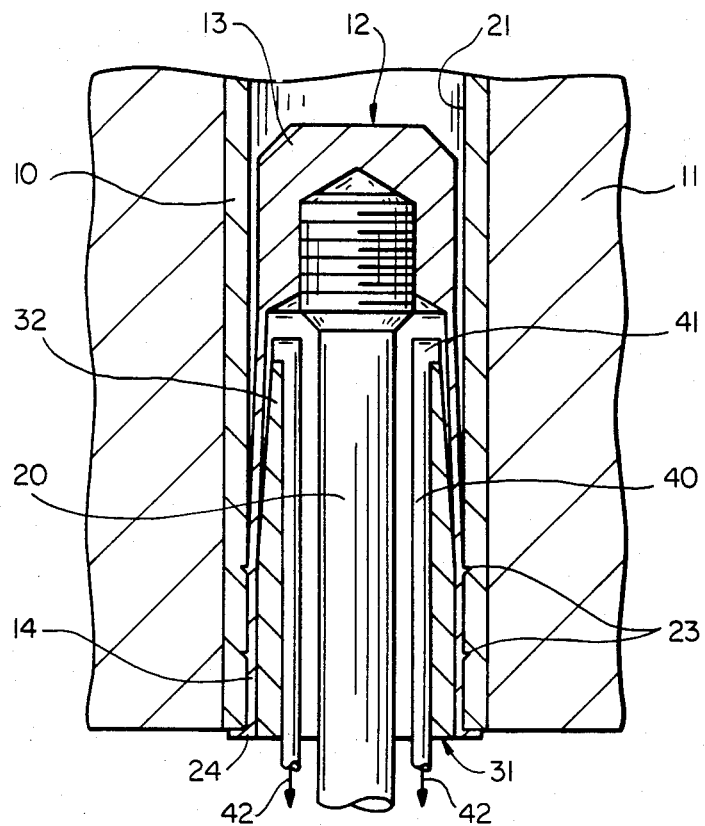
FIG_4
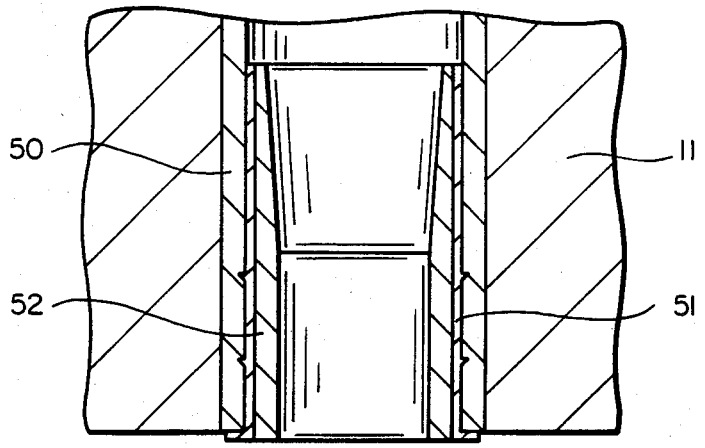
FIG_5

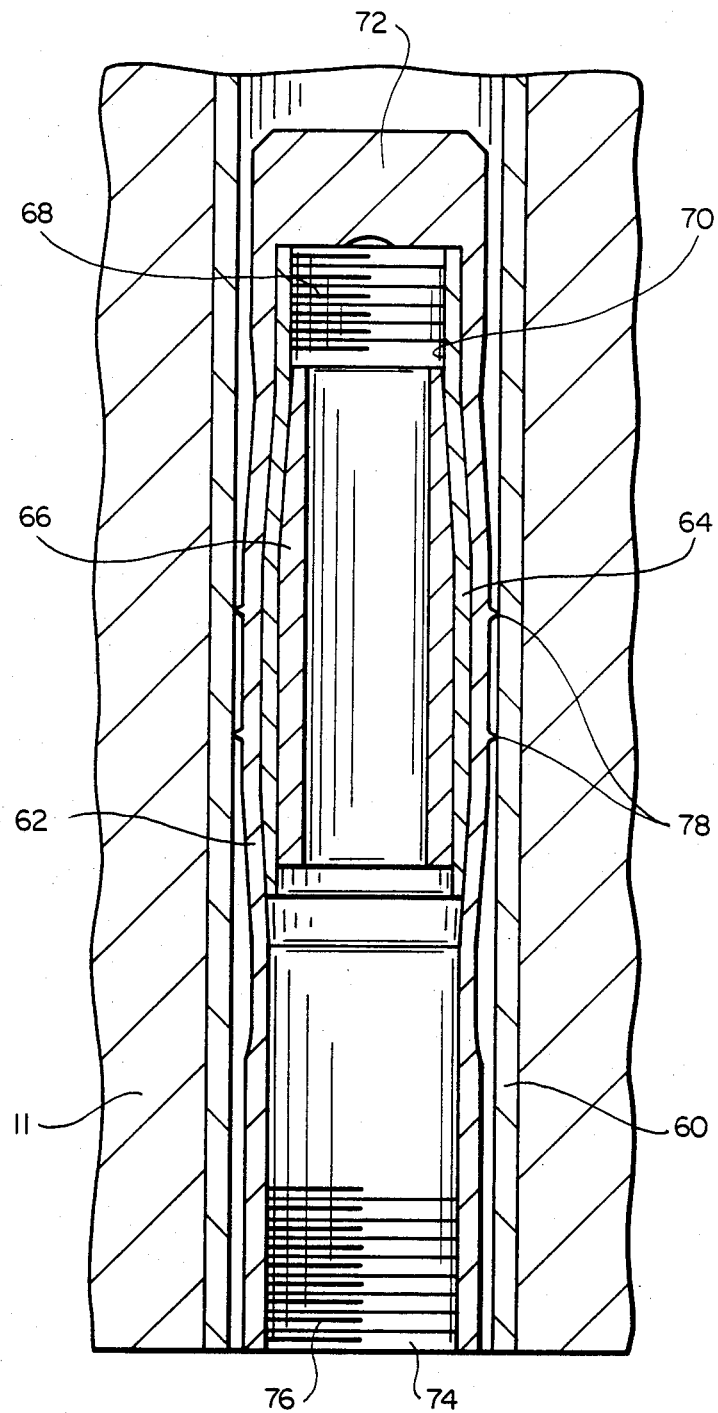
FIG_6

ANNULAR TUBE-LIKE DRIVER

RELATED APPLICATION

This application is a continuation of copending Application Ser. No. 700,373, filed Feb. 11, 1985, entitled, "Annular Tube-Like Driver", now abandoned which is a continuation-in-part of copending Application Ser. No. 522,187 filed Nov. 15, 1983, entitled, "Annular Tube-Like Driver," now abandoned, both of which are incorporated herein by reference.

BACKGROUND OF THE INVENTION

1. Field of the Invention

This invention relates to an annular tube-like driver made of a shape-memory alloy for insertion into a tube insert which in turn is inserted into a tube.

2. Discussion of the Prior Art

In tube-type heat exchangers a first fluid flows through the heat exchanger tubes while a second fluid is in heat-exchanger relationship therewith. If one of the tubes becomes defective a leak can occur which is obviously an unsatisfactory situation. In this situation it is sometimes necessary to plug the defective tube so that fluid does not flow therethrough, thereby preventing leakage and correcting the defective condition. In addition, it is sometimes necessary to provide a liner to the inside of a tube.

If such a defect occurs in the steam generator tubes of a nuclear reactor power plant, a very serious situation can result. When such a defect occurs in these tubes it not only allows coolant in the tubes to mingle with fluid outside the tubes, but also creates a radioactive contamination problem. It is clearly quite important not to allow fluid to leak from the tubes and contaminate the surrounding fluid since the fluid in the tubes is generally radioactive. Plugging or sleeving the offending tube solves the problem and prevent contamination.

Mechanical lugging devices are commonly used to plug heat exchange devices, such as that shown in U.S. Pat. No. 4,390,042. Mechanical devices, however, inherently depend upon mechanical installation and the skill of a particular installer. Therefore, they are not always entirely effective. Also, mechanical devices can be and often are difficult to install and remove, both of which represent serious problems.

In addition, providing a liner to the inside of a tube is a difficult procedure, especially where the tube is located in an operating situation.

U.S. Pat. No. 3,900,939 utilizes a tube plug fabricated from a metallic alloy having a mechanical memory characteristic, i.e., a shape-memory alloy, whereby it can be physically deformed into a reduced diameter for insertion into the defective tube and thereafter induced to assume its original, larger diameter to secure the plug within the tube. However, this patent relies solely on the shape-memory alloy to plug the tube and it may not be entirely effective for this purpose and presents severe removability problems.

Materials, both organic and metallic, capable of possessing shape memory are well known. An article made of such materials can be deformed from an original, heat-stable configuration to a second, heat-unstable configuration. The article is said to have shape memory for the reason that, upon the application of heat alone, it can be caused to revert from its heat-unstable configuration to its original, heat-stable configuration, i.e., it "remembers" its original shape.

Among metallic alloys the ability to possess shape memory is a result of the fact that the alloy undergoes a reversible transformation from an austenitic state to a martensitic state with a change of temperature. Also, the alloy is considerably stronger in its austenitic state than in its martensitic state. This transformation is sometimes referred to as a thermoelastic martensitic transformation. An article made from such an alloy, for example, a hollow sleeve, is easily deformed from its original configuration to a new configuration when cooled below the temperature at which the alloy is transformed from the austenitic state to the martensitic state. The temperature at which this transformation begins is usually referred to as the $M_s$ temperature. When an article thus deformed is warmed to the temperature at which the alloy starts to revert back to austenite, referred to as the $A_s$ temperature, the deformed object will begin to return to its original configuration.

Shape-memory alloys have found many uses in recent years. For example, pipe coupling such as are described in U.S. Pat. Nos. 4,035,007, 4,198,081 and 4,309,807 and British Pat. Nos. 1,553,427, 1,554,431, 1,554,432, 1,554,433 and 1,488,393, electrical connectors such as those described in U.S. Pat. No. 3,740,839, switches such as those described in U.S. Pat. No. 4,205,293 and fastening devices such as are described in British Pat. No. 1,548,964.

It would thus be desirable to develop a method for providing a liner to the inside of the tube, and also to develop a method for plugging a tube, all in a convenient, economic and efficient manner, amenable to remote installation with robotics. It would also be desirable to develop an improved removable structure for achieving the foregoing.

DESCRIPTION OF THE INVENTION

Summary of the Invention

The invention is an annular tube-like driver of a shape-memory alloy having a martensitic state and an austenitic state for insertion into a tube insert in a tube. The driver has a configuration in its martensitic state such that when it is inserted it is capable of exerting outward pressure on said tube insert to move the insert outwardly toward the tube, and, when in its austenitic state, is capable of increasing the pressure between the insert and the tube.

In one aspect of the present invention the driver has a tapered leading edge in its martensitic state, the tube insert has an inside diameter, the tapered leading edge of the driver has an outside diameter smaller than the inside diameter and the trailing edge of the driver has an outside diameter larger than said inside diameter.

In accordance with the present invention the driver is deformed by insertion while in its martensitic state and is capable of recovery to a non-deformed shape when transformed to its austenitic state.

The present invention also includes a composite structure comprising an annular tube insert having an external surface for engagement with the inside surface of a tube, an annular tube-like driver within said tube insert made of a shape-memory alloy having a martensitic state and an austenitic state. The driver has a configuration such that when it is inserted in its martensitic state it is capable of exerting outward pressure on said tube insert to expand the tube insert outwardly while being simultaneously deformed itself. The driver in its austenitic state is capable of recovery to its non-deformed condition to increase the pressure between the tube insert and the inside tube surface. The composite structure of the present invention is also removable by returning the driver to its martensitic state, reducing pressure exerted by the driver on the tube insert. In one embodiment the tube insert is closed at one end to plug the annular tube and preferably includes threads at the closed end of the tube insert. Preferably, the external surface of the insert includes means for engaging the inside tube surface.

In an alternative embodiment of the composite structure, the composite structure may further include a soft material insert interposed between the annular tube insert and the annular tube-like driver.

The present invention also includes a method of forming a composite tube structure. The method of the present invention comprises providing an annular tube having an inside tube surface, inserting a tube insert having an inside diameter and an external surface for engagement with the inside tube surface within said tube, providing an annular driver made of a shape-memory alloy having a martensitic state and an austenitic state having a configuration in its martensitic state to exert outward pressure on said tube insert and in its austenitic state being capable of increasing the pressure between the external surface of the tube insert and the inside tube surface, exerting outward pressure on said tube insert by inserting said driver into said insert in its martensitic state while simultaneously deforming said driver and recovering said driver to its non-deformed condition, increasing the pressure between the inside tube surface and external insert surface by transforming said driver to the austenitic state. The driver is also capable of further moving the insert outwardly into firm engagement, i.e., increasing pressure, with the inside tube surface by transforming said driver to the austenitic state, initial movement having been accomplished by insertion of the driver. It is also within the scope of the invention to deform (pre-compress) the driver partially prior to insertion to provide increased retention pressure and/or additional incremental movement of the driver when the driver is transformed to its austenitic state.

When the method of forming a composite structure is practiced with the aforementioned alternative embodiment of the composite structure, the method will further include the step of inserting a soft material insert within the annular tube insert.

BRIEF DESCRIPTION OF THE DRAWINGS

FIG. 1 is a partial sectional view showing a plug-like tube insert and driver in their separated position.

FIGS. 2 and 3 are partial sectional views showing the components of FIG. 1 in their assembled condition.

FIG. 4 is a partial sectional view showing a device for separating the assembled components of FIGS. 1-3.

FIG. 5 is a partial sectional view showing assembled components in an alternate embodiment.

FIG. 6 is a partial sectional view showing the assembled components in another alternate embodiment.

DETAILED DESCRIPTION OF THE PREFERRED EMBODIMENTS

Referring to FIG. 1, tube 10 is shown connected to tube sheet 11. It is desired to plug tube 10 or to provide an internal lining to tube 10. In the embodiment of FIG. 1, there is shown the plugging of tube 10 with tube insert 12. Tube insert 12 is closed at the leading end 13 and open at the trailing end 14. Also, threads 15 are provided at closed end 13 for engagement with an insertion and removal means, such as bar 20 to be described below. Tube 10 and tube insert 12 may be made of any desired material based on the particular environment of use. Generally, for example, tube 10 is a metal heat-exchanger tube, for example, a tube of a nuclear reactor power plant, and tube insert 12 a metal insert. Tube insert 12 may be of the same material as tube 10, or a different material, if desired. For example, both tube 10 and tube insert 12 may be of the same metal or metal alloy in an exemplificative embodiment.

It is intended to engage the internal surface 21 of tube 10 with the external surface 22 of tube insert 12. In order to provide a firm engagement therebetween, it is preferred to provide means on external surface 22 of tube insert 12 such as teeth 23 which are capable of biting into internal surface 21 of tube 10 as shown in FIGS. 2 and 3. Naturally, a variety of such means may be readily envisioned, such as, for example, a roughened insert surface, or a simple provision of lands and grooves on external surface 22. Alternatively, other means for engaging surfaces 21 and 22 may include glues, epoxies and overlays of soft material and/or fusible materials. In a preferred embodiment, means are provided to limit the depth of insertion of tube insert 12 into tube 10, such as flanges 24 on trailing edge 14 of tube insert 12 which engage the external surface of tube 10.

As shown in FIG. 1, tube insert 12 preferably sits loosely in tube 10 so that it can be readily and conveniently inserted therein. Thus, in the preferred embodiment, the outside diameter of tube insert 12 is slightly smaller than the inside diameter of tube 10. Preferably, tube insert 12 is inserted into tube 10 by means of bar 20 having threads 30 complementary to threads 15 in closed end 13 of tube insert 12 as shown in FIG. 1. Similarly, as will be described hereinbelow, a means such as threaded bar 20 may also be used for removal of tube insert 12 from tube 10.

An annular tube-like driver 31 is provided of a shape-memory alloy having a martensitic state and an austenitic state. The driver in its martensitic state preferably has a tapered leading edge 32 for insertion into tube insert 12. Preferably, the tapered leading edge 32 of driver 31 has an outside diameter smaller than the inside diameter of tube insert 12 and a trailing edge 33 with an outside diameter larger than the inside diameter of tube insert 12, as clearly shown in FIG. 1. Thus, said preferred driver configuration in its martensitic state exerts outward pressure on said tube insert upon insertion therein, although other specific driver configurations could of course be used.

The shape-memory alloy driver in its austenitic state is capable of increasing the pressure between the tube insert 12 and the inside surface of tube 10, and moving the tube insert 12 outwardly into firm engagement with the inside surface of tube 10. The driver is deformed while in its martensitic state and is capable of recovery to a non-deformed shape when transformed to its austenitic state. As stated hereinabove, it is known that shape-memory alloys are considerably stronger in their austenitic state than in their martensitic state. Therefore, in one embodiment of the present invention, driver 31 is inserted in insert 12 in its martensitic state, compressing during insertion using the pseudoelastic portion of the martensitic stress strain curve to keep installation forces low. Compressing the driver in its martensitic state allows a large amount of tube insert deformation with low insertion force, thereby avoiding tube insert buckling. Tube insert 12 is fully installed when the trailing end 33 of driver 31 is flush with trailing end 14 of tube insert 12. When the driver is heated above its transformation temperature, the yield strength of the driver improves, thereby increasing the pressure between the external surface of the tube insert and the inside tube surface. Alternatively, one can provide the driver 31 has a slightly larger external diameter in its austenitic state than in its martensitic state. In this embodiment, when the plug is heated above its transformation temperature, the driver expands outwardly as shown by arrows 34 in FIG. 3 moving the tube insert outwardly into firm engagement with the inside of the tube.

Installation of driver 31 is readily accomplished by any desired installation means such as means 35 shown schematically in FIG. 1 for engagement with trailing end 33 of driver 31. Bar 20 may also be readily inserted with the same means 35 or with a separate means, if desired, and may have threads 36 located on the trailing end thereof for engagement with such insertion means. Thus, it can be seen that installation is readily accomplished by easily forcing driver 31 into tube insert 12. As the driver 31 is inserted into tube insert 12, the insert expands outwardly with teeth 23 engaging the interior tube walls. Outward pressure increases when the driver is transformed to its austenitic state. When removal of the assembly is desired, one needs simply to cool driver 31 below its transformation temperature, thereby reducing the pressure between tube insert 12 and tube 10, and pull the driver and insert out of the tube either simultaneously or sequentially. Removal of the cooled driver 31 allows access to the tube insert 12 which tends to spring back to a non-expanded dimension and may be easily removed. An exemplificative embodiment of such removal is shown in FIG. 4 where bar 20 is shown in engagement with threads 15 on leading edge 13 of insert 12. Driver removal means 40 is provided with a leading flange 41 for engagement with tapered leading edge 32 of driver 31. As shown in FIG. 4, the driver removal means 40 is simply inserted between bar 20 and driver 31 and the driver removal means moved in the direction of arrows 42 by any desired actuating means. Flange 41 clips over leading edge 32 and the driver may be removed either prior to removal of the tube insert 12 or at the same time therewith. Naturally, removal of the tube insert 12 is accomplished by means of threaded bar 20.

FIG. 5 shows an alternate embodiment of the present invention wherein tube 50 is provided with a tube liner or tube insert 51 by means of driver 52 in a manner similar to FIGS. 1-3. Thus, tube insert or liner 51 is similar to tube insert 12 except that there is no closed end so that tube 50 is not plugged. Naturally, it may be desired in many applications to simply line the internal portions of a tube which can be readily and conveniently accomplished in accordance with the present invention.

Referring not to FIG. 6, there is illustrated a further alternate embodiment of the invention. In this embodiment, annular tube insert 62 is inserted within tube 60 as in the previous embodiments. The embodiment in FIG. 6, however, also includes a soft material insert 64 which is inserted within, and engages the internal surface of, the annular tube insert 62. Finally, the annular driver 66 is then inserted within the soft material insert 64.

The action of the annular driver is the same as in the previous embodiments with the exception that outward pressure is exerted on the annular tube insert through the soft material insert. That is, outward pressure on the annular tube insert by the driver is now applied indirectly instead of directly. Even though there is now an element interposed between the annular tube insert and the driver, there will nevertheless be adequate pressure developed between the inside tube surface and the external annular tube insert surface upon transformation of the driver to the austenitic state.

Removal of the driver may be accomplished as previously described. For removal of the soft material insert, threads 68 are provided on the internal surface 70 of the soft material insert proximate to the leading end 72 of the annular tube insert. If the composite structure is to be used as a plug, then leading end 72 will be closed.

The annular tube insert may contain threads at the closed end as in the previous embodiments. Alternatively, there may be threads 76 located at trailing end 74 as shown in FIG. 6. In either case, the threads assist in the insertion and removal of the annular tube insert.

It can be appreciated that the soft material insert can be made from a variety of material. It is preferred, however, that it be made from a soft metal such as an annealed brass and, most preferred, that it be made from nickel 201. Nickel 201 is a soft-annealed nickel.

The purpose of the soft material insert is to reduce the amount of cold work imparted to the annular tube insert during expansion by the driver. This reduction in cold work comes about because either the wall thickness of the annular tube insert or the height of its engaging means (e.g., teeth 78) or both are reduced when the soft material insert is present. The annular tube insert may be removed by stretching its length by a suitable apparatus which causes a decrease in its outside diameter. The decrease in outside diameter frees the engaging means from the internal surface of the tube so that the annular tube insert may now be readily removed.

Now, if there was any greater amount of cold work imparted to the annular tube insert, such as would be the case if the soft material insert were not present, stretching the insert would not be possible so the insert would tend to fracture. Removal of the annular tube insert would then have to be accomplished by pulling it out which is not preferred as this would gall the internal surface of the tube.

In sum, the provision of the soft material insert facilitates the removal of the annular tube insert.

Any shape-memory alloy may be used as the driver of the present invention. In the preferred embodiment, nickel-titanium alloys are employed. Optionally, the nickel-titanium alloys may contain small amounts of one or more additives in order to achieve particularly desirable results, such as, for example, nickel-titanium alloys containing small amounts of copper, iron or other desirable additives. Alternatively, copper-base alloys may, of course, be readily employed exhibiting shape-memory behaviour. Any of the shape-memory alloys described in the foregoing patents, for example, may be readily employed.

This invention may be embodied in other forms or carried out in other ways without departing from the spirit or essential characteristics thereof. The present embodiment is therefore to be consdiered as in all respects illustrative and not restrictive, the scope of the invention being indicated by the appended claims, and all changes which come within the meaning and range of equivalency are intended to be embraced therein.

What is claimed is:

1. A composite structure comprising:
    an annular tube insert for insertion within a tube, said insert having an external surface for engagement with the inside tube surface of a tube;
    a soft material insert within said annular tube insert; and
    an annular tube-like driver within said soft material insert made of shape-memory alloy having a martensitic state and an austenitic state and having a configuration such that when it is inserted in its martensitic state it is capable of exerting an outward pressure on said annular tube insert through said soft material insert while simultaneously being deformed by said inserts and when transforming to its austenitic state it is capable of recovering toward its non-deformed condition to increase the pressure between the annular tube insert and the inside tube surface; said driver having a tapered leading edge in its martensitic condition and said soft material insert having an inside diameter, the tapered leading edge of said driver having an outside diameter smaller than the inside diameter of said soft material insert.

2. A composite structure according to claim 1 wherein said soft material insert is made from a soft metal.

3. A composite structure according to claim 2 wherein the soft metal is nickel 201.

4. A composite structure according to claim 1 wherein said annular tube insert is closed at one end to plug said annular tube.

5. A composite structure according to claim 1 wherein the external surface of said annular tube insert includes means for engaging the inside tube surface.

6. A composite structure according to claim 4 including threads at the closed end of the annular tube insert.

7. A composite structure according to claim 6 wherein said soft material insert has a threaded internal surface proximate to the closed end of the annular tube insert.

8. A composite structure according to claim 4 wherein the driver is removable, the driver capable of reducing outward pressure on the soft material insert and the annular tube insert when the driver is returned to its martensitic state.

9. A composite structure comprising:
    an annular tube insert for insertion within a tube, said insert having an external surface for engagement with the inside tube surface of a tube and being closed at one end to plug said annular tube, said insert having threads at the closed end of the insert; and
    an annular tube-like driver within said tube insert made of a shape-memory alloy having a martensitic state and an austenitic state having a configuration such that when it is inserted in its martensitic state it is capable of exerting an outward pressure on said insert while simultaneously being deformed by said insert and when upon transforming to its austenitic state it is capable of recovery to its non-deformed condition to increase the pressure between the insert and the inside tube surface.

10. A composite structure comprising:
    an annular tube insert for insertion within a tube, said insert having an external surface for engagement with the inside tube surface of a tube and having an inside diameter; and
    an annular tube-like driver within said tube insert made of a shape-memory alloy having a martensitic state and an austenitic state having an outside diameter larger than the inside diameter of said insert such that when it is inserted in its martensitic state it is capable of exerting an outward pressure on said insert while simultaneously being deformed by said insert and when upon transforming to its austenitic state it is capable of recovery to its non-deformed condition to increase the pressure between the insert and the inside tube surface, said driver having a tapered leading edge in its martensitic state, said tapered leading edge of the driver having an outside diameter smaller than said inside diameter.

11. A composite structure according to claim 10 wherein said insert is closed at one end to plug tube.

12. A composite structure according to claim 10 wherein the external surface of said insert includes means for engaging the inside tube surface.

13. A composite structure according to claim 11 wherein the driver is removable, the driver capable of reducing outward pressure on the insert when the driver is returned to its martensitic state.

* * * * *